US008510372B2

(12) United States Patent
Toumura

(10) Patent No.: US 8,510,372 B2
(45) Date of Patent: Aug. 13, 2013

(54) GATEWAY SYSTEM AND CONTROL METHOD

(75) Inventor: Kunihiko Toumura, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 278 days.

(21) Appl. No.: 12/850,351

(22) Filed: Aug. 4, 2010

(65) Prior Publication Data

US 2011/0035437 A1 Feb. 10, 2011

(30) Foreign Application Priority Data

Aug. 10, 2009 (JP) ................................ 2009-185624

(51) Int. Cl.
*G06F 15/16* (2006.01)
*G06F 15/173* (2006.01)
*G06F 15/177* (2006.01)

(52) U.S. Cl.
USPC ........................... 709/203; 709/220; 709/223

(58) Field of Classification Search
USPC .......................... 709/203, 217–219, 220–226
See application file for complete search history.

(56) References Cited

U.S. PATENT DOCUMENTS

| 6,108,703 | A * | 8/2000 | Leighton et al. ............... 709/226 |
| 6,212,565 | B1 | 4/2001 | Gupta |
| 6,351,775 | B1 | 2/2002 | Yu |
| 6,553,413 | B1 | 4/2003 | Lewin et al. |
| 6,823,377 | B1 | 11/2004 | Wu et al. |
| 2005/0038865 | A1* | 2/2005 | Noda et al. ..................... 709/213 |
| 2006/0248195 | A1* | 11/2006 | Toumura et al. ............... 709/226 |
| 2008/0235400 | A1* | 9/2008 | Slocombe et al. ............. 709/245 |
| 2009/0248786 | A1 | 10/2009 | Richardson et al. |

FOREIGN PATENT DOCUMENTS

| JP | 10-222449 A | 8/1998 |
| JP | 11-4261 A | 1/1999 |
| JP | 2000-207270 A | 7/2000 |
| JP | 2001-273186 A | 10/2001 |
| JP | 2002-520735 A | 7/2002 |
| JP | 2002-523838 A | 7/2002 |
| JP | 2004-30690 A | 1/2004 |
| JP | 2004-348494 A | 12/2004 |
| JP | 2011-519203 A | 6/2011 |
| WO | WO 01/84800 A2 | 11/2001 |

OTHER PUBLICATIONS

Corresponding European Search Report dated Nov. 23, 2010 (seven (7) pages). Karger et al., "Web Caching with Consistent Hashing", Computer Networks 31, 1999, pp. 1203-1213, Published by Elsevier Science B.V.
Goldberg "Lecture 8b: Proxy Server Load Balancing", Computer Science Department, New York University, Retrieved from the Internet: http://www.cs.nyu.edu/artg/internet/Spring2004/lectures/lec_8b.pdf., Mar. 2004.
Ross "Hash-Routing for Collections of Shared Web Caches", http://www.seas.upenn.edu/ross 1997, pp. 1-21.
Japanese Office Action dated Mar. 19, 2013 including English-language translation (Seven (7) pages).

* cited by examiner

*Primary Examiner* — Joshua Joo
(74) *Attorney, Agent, or Firm* — Crowell & Moring LLP

(57) ABSTRACT

A gateway system for distributing requests from multiple terminals to multiple first servers includes a second server device and a name resolution device wherein: an address generating function for generating an IP address from a character string is distributed to the name resolution device, and multiple specified IP addresses are registered in the second server devices; when the name resolution device receives a first request for resolving a name, the name resolution device extracts the access destination URL from the first request, generates an IP address from the character string of the host name of the extracted URL by utilizing the address generating function, and sends the generated IP address to the terminal; and when the terminal sends a second request setting the access destination of the URL for the first server device, to the second server device where the IP address is registered, the second server device transfers that transmitted second request to the first server device based on the URL of the access destination.

10 Claims, 14 Drawing Sheets

FIG. 2A

ADDRESS ASSIGNMENT TABLE
200

| SERVER ID | START ADDRESS | END ADDRESS |
|---|---|---|
| 1 | 2001:db8::0000: ⋯ | 2001:db8::1fff: ⋯ |
| 2 | 2001:db8::2000: ⋯ | 2001:db8::2fff: ⋯ |
| ⋯ | ⋯ | ⋯ |

FIG. 2B

ADDRESS GENERATING FUNCTION
210

$$f(x) = 2001:db8:: + sha1(x) \wedge 0xFFFFFFFFFFFFFFFF$$

215 HASH FUNCTION

FIG. 2C

DOMAIN NAME TABLE
220

| DOMAIN NAME | CONVERSION ITEM |
|---|---|
| *.jp | ○ |
| www.example.com | × |
| *.com | ○ |
| *.net | ○ |
| ⋯ | ⋯ |

FIG. 6A

ASSIGNED IP ADDRESS TABLE
600

| START ADDRESS (601) | END ADDRESS (602) |
|---|---|
| 2001:db8::0000:0000:0000:0000 | 2001:db8::1fff:ffff:ffff:ffff |
| 2001:db8::4000:0000:0000:0000 | 2001:db8::9fff:ffff:ffff:ffff |
| 2001:db8::fe00:0000:0000:0000 | 2001:db8::ffff:ffff:ffff:ffff |

FIG. 6B

CONTENT TABLE
610

| URL (611) | DESTINATION IP ADDRESS (612) | CONTENTS (613) | METADATA (614) |
|---|---|---|---|
| http://www.example.org/index.html | 2001:db8::41de:3297:ec18:5fae | <html>.....</html> | Expire: 05 Jun 2010 00:00:00<br>Size: 1235<br>.... |
| http://www.example.com/index.html | 2001:db8::781c:1dc6:87ed:0c4b | <html>.....</html> | Expire: ...<br>Size: .... |
| http://www.example.com/image.jpg | 2001:db8::781c:1dc6:87ed:0c4b | JFIF..... | Expire: ...<br>Size: .... |
| ... | ... | ... | ... |

GATEWAY SYSTEM AND CONTROL METHOD

CLAIM OF PRIORITY

The present application claims priority from Japanese patent application JP 2009-185624 filed on Aug. 10, 2009, the content of which is hereby incorporated by reference into this application.

FIELD OF THE INVENTION

The present invention relates to technology for load balancing in gateway systems for client-server type network services.

BACKGROUND OF THE INVENTION

Traffic processed by carrier gateways is vastly increasing due to boosted terminal performance and access networks that work at ever higher speeds. Carriers therefore attempt to increase the number of traffic lines to the Internet and to reduce traffic at the gateway by using information processing technology.

The content cache is one type of information processing technology for reducing traffic. In this technology, when a terminal has requested contents from a server device (such as a Web server) over the Internet, a gateway server device (such as a Web proxy) temporarily stores the contents acquired from the Web server; and when another terminal requests contents, the Web proxy acting as the Web server, sends back a reply to the stored contents.

The gateway can in this way reduce traffic with the Web servers. The gateway can also speed up the content acquisition process.

The gateway can accommodate a numerous terminals and may include multiple server devices for storing contents in large quantities. The gateway distributes the contents to these server devices. Distributing the contents to these multiple server devices is an extremely effective method when the server devices utilized by the gateway have only limited performance.

A load balancer device is usually installed for example between the terminal and the gateway server device in order to distribute the processing among multiple server devices. The load balancer device transfers the request (such as a content acquisition request) from a terminal to each server device. The process for distributing the load may vary depending on to what extent the request from the terminal is analyzed.

Load balancer devices can process a large volume of traffic if for example distributing loads based on low layer information such as the IP address of the transmit source. However the information needed for calculating the transfer destination from the terminal is minimal so the load balancer device might prove unable to correctly distribute the load.

The load balancer device can also distribute loads appropriately according to each application's characteristics when distributing loads based on information such as layer 7 information including HTTP requests. However, the load of the load balancer device itself becomes high so that the load balancer device might prove incapable of managing numerous servers.

The following load balancing technology capable of resolving the aforementioned problems have been proposed.

A technology was proposed for distributing requests to each server device based on a table for determining the transmit source (See for example, JP-A-Hei11(1999)-004261. The technology disclosed in JP-A-Hei11(1999)-004261 allows terminals to distribute requests to each server by utilizing a table distributed to the terminal for determining which server to transmit the request to. Moreover, the reply to the request from the terminal includes table update information and so also reduces the load imposed by distributing the table.

Another technology was also proposed for distributing server requests from terminals to each gateway based on the hash values generated from each server request (See for example, JP-T-2002-523838). In the technology disclosed in JP-T-2002-523838, the hash value generated from the request is utilized as the gateway index so requests with the same content (such as content acquisition requests for the same host) from each terminal are sent to the same gateway.

Still another technology was proposed for calculating the hash value based on contents requested from the terminal, and selecting an appropriate server device as the transfer destination for the request based on the hash value calculated by the load balancer device (See for example, JP-A-2004-030690). In the technology disclosed in JP-A-2004-030690, the load balancer device is capable of distributing the processing to each server device since the load balancer device transfers requests by utilizing a hash value calculated based on the content in the request from the terminal.

SUMMARY OF THE INVENTION

In the technology disclosed in JP-A-2004-030690, the load balancer device must calculate a hash value which increases the processing load on the load balancer device so the load balancer device might become a traffic bottleneck. In other words, the method utilizing a load balancer device concentrates the load in the load balancer device itself so that the load balancer device might become a single point of failure. The technology disclosed in JP-A-Hei11(1999)-004261 and JP-T-2002-523838 on the other hand does not require a load balancer device.

In the technology disclosed in JP-A-Hei11(1999)-004261 however, each terminal manages the transfer destination information (table) in the request. The problem therefore occurs that when the applicable server device (Web server) was changed, the table must then be updated which increases the load. Table search (retrieval) functions and update functions must also be added to the terminal. The patent document JP-A-Hei11(1999)-004261 therefore has the problem that high costs are required for adding new technology to systems already in use.

The technology disclosed in JP-T-2002-523838 has the same problem as disclosed for JP-A-Hei11(1999)-004261 in that table search functions and update functions must also be added to the terminal. In cases where the hash value is calculated by the terminal then a function must be added at the terminal to calculate the hash value.

In view of the above problems with the related art, the present invention has the object of providing a gateway system capable of distributing the load to multiple gateways without installing complicated load balancer devices at the stage prior to the gateway and without having to add complicated functions to the terminal. More specifically, the gateway system of this invention is capable of generating IP addresses based on values for identifying the request contents such as hash values generated from the destination host name or the URL, and then appropriately distributing content access to each gateway.

Representative aspects of the present invention are described next. Namely, a gateway system for distributing requests from multiple terminals to multiple first server devices includes multiple second server devices and a name resolution device, in which: unique aspects are address generating functions for generating an IP address from a character string distributed to the name resolution device, and multiple specified IP addresses that are registered in each of the second server devices; and when a first request for resolving the name of the access destination URL sent from the terminal is received, the name resolution device extracts the access destination URL from the first request that was received, generates an IP address from the character string of the host name of the extracted URL by using the address generating function, and sends the generated IP address to the terminal as the response to the first request; and when the terminal sends a second request setting the access destination of the URL for the first server device to the second server device where the IP address sent as the reply to the first request is registered, the second server device forwards that transmitted second request to the first server device based on the URL of the access destination.

The gateway system of the embodiments of this invention can distribute the load uniformly without using a load balancer device because the name resolution device in the gateway system generates an IP address for server devices based on hash values.

BRIEF DESCRIPTION OF THE DRAWINGS

FIG. 2A is a drawing for describing the structure of the address assignment table contained in the management server of the first embodiment of this invention;

FIG. 2B is a drawing for describing the address generating functions contained in the management server of the first embodiment of this invention;

FIG. 2C is a drawing for describing the structure of the applicable domain name table contained in the management server of the first embodiment of this invention;

FIG. 6A is a drawing for describing the structure of the assigned IP address table contained in the Web proxy of the first embodiment of this invention;

FIG. 6B is a drawing for describing the structure of the contents table contained in the Web proxy of the first embodiment of this invention;

DETAILED DESCRIPTION OF THE PREFERRED EMBODIMENTS

Figure 1:
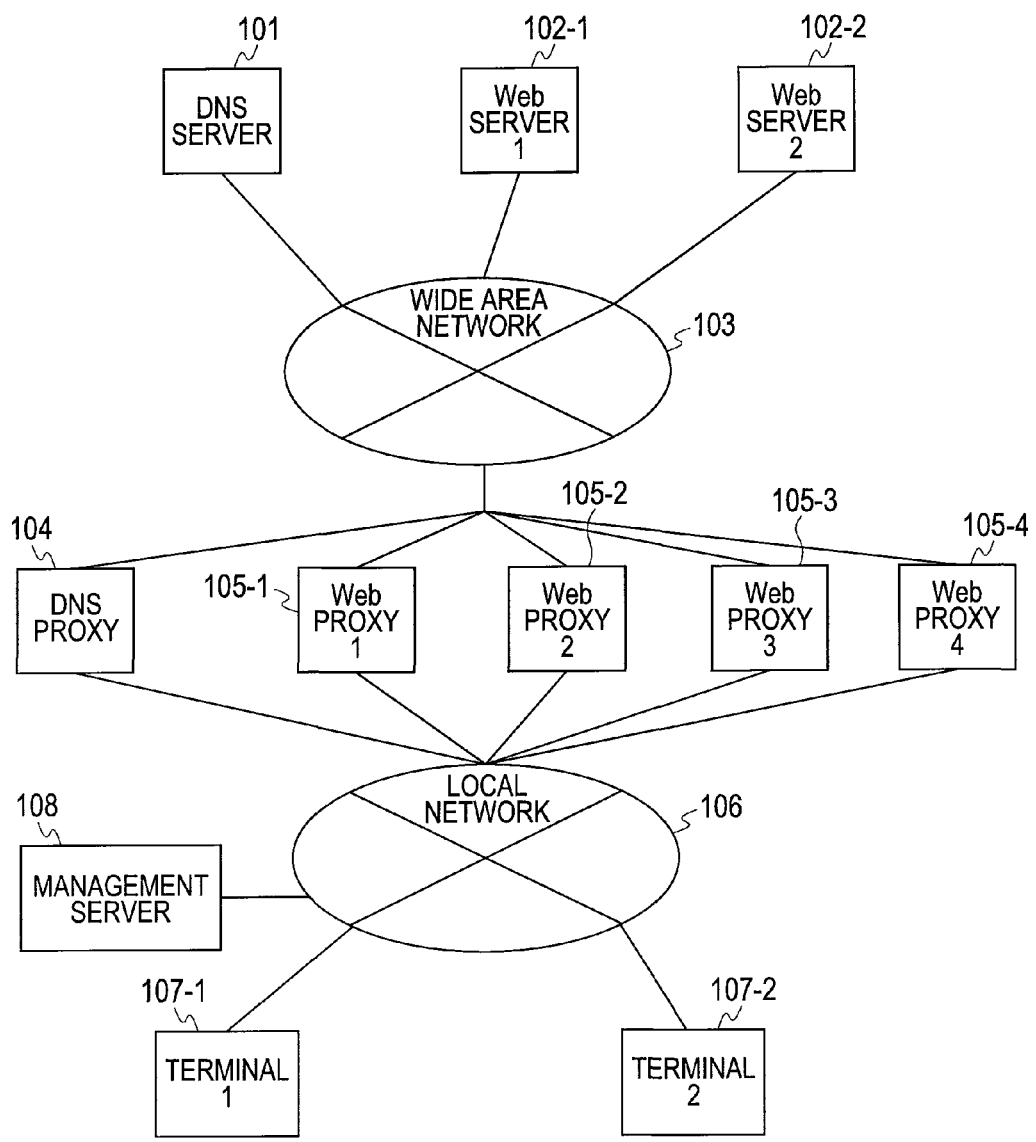
FIG. 1 is a drawing for describing the structure of the gateway system of the first embodiment of this invention.

A brief summary of the present invention is described next.

The gateway system according to an exemplary embodiment of this invention includes multiple server devices (Web proxies), name resolver devices (DNS proxies) and management devices (management servers) and can be applied for example to content cache systems, etc. This invention is not limited to systems for caching contents but may also be applied for example to systems for distributing load between server devices.

The range of the assigned IP address is allotted to multiple Web proxies. The DNS proxy resolves the name by using address generating functions. Specifically, after receiving a request from a terminal, the DNS proxy calculates the hash value from the identifier in the request (such as a host name for the content acquisition destination), generates an IP address based on that calculated hash value, and sends a reply back the generated IP address to the terminal.

Based on the reply IP address, the terminal sends a request to the Web proxy handling that IP address, so the gateway system can distribute the load without having to use a load balancer device. The terminal can in this way acquire the transmit destination of the request by utilizing the DNS proxy processing. The terminal therefore does not require any new functions to utilize this gateway system. Moreover, the management server allots all IP addresses generated by the DNS proxy to a range covered by multiple IP addresses, and assigns that allotted IP address range to each of the Web proxies. The DNS proxy therefore does not have to retain information (assigned IP address table) showing the IP address range where each of the proxies are assigned.

When accessing the host (Web server) of that content acquisition address, the terminal also asks the DNS proxy about the IP address matching that host name. The DNS proxy sends back to the terminal an IP address generated based on the address generating function. The terminal then sends content acquisition requests and so on using that IP address as the transmit destination. This request then reaches one of the gateway's Web proxies by following the usual IP routing. The Web proxies of that gateway then cache the contents of the host for that assigned IP address.

The Web proxy may take advantage of its other functions to utilize information (path names) other than host name of the URL serving as the content acquisition address, as information sources for appropriately distributing the load.

More specifically, when a content acquisition request is received from the terminal, the Web proxy calculates the hash value from the full URL content of the acquisition destination shown in the content acquisition request, and adds that calculated hash value to the URL as the host section suffix. The Web proxy then returns the URL with the added hash value to the terminal.

The Web proxy acquires contents from the Web server based on the content acquisition request. If the acquired contents include a URL as a link destination, then the Web proxy calculates the hash value from that full URL and attaches that calculated hash value to the applicable URL. The Web proxy sends back the URL with attached hash value to the terminal as a reply to the content acquisition request. So if a hash value was generated in this way from information (full URL for the content acquisition address) contained in the request, then requests destined for the same Web server (content acquisition request with same host) can be distributed to Web proxies by user and by content.

First Embodiment

The first embodiment of this invention is described next while referring to the drawings.

FIG. 1 is a drawing for describing the structure of the gateway system of the first embodiment of this invention.

The gateway system of the present embodiment contains a DNS proxy 104, multiple Web proxies (Web proxy 1_105-1, Web proxy 2_105-2, ... ) and a management server 108. Each device mutually connects via a local network 106.

The DNS proxy 104 and the multiple Web proxies (Web proxy 1_105-1 and others) connect by way of the wide area network 103 to the DNS server 101, multiple Web servers (Web server 1_102-1, Web server 2_102-2, ... ) to provide services to the multiple terminals (terminal 107-1, terminal 2_107-2, ... ) connected to the local network 106. For example, request messages from the terminal 107_1 to the Web server 1_102-1 and reply messages from Web server 1_102-1 to the terminal 107_1 are sent and received via any of the Web proxies.

If jointly describing all or any of multiple Web proxies, then Web proxy 105 is utilized as a general name for the multiple Web proxies in this description. Moreover if jointly describing any or all of multiple Web servers, then Web server 102 is utilized as a general term for multiple Web servers. If jointly describing any of multiple terminals then terminal 107 is utilized as a general term for multiple terminals in this description.

In the example for FIG. 1, one DNS server 101, two Web servers 102, four Web proxies 105, as well as two terminals 107 were specified. However more units than specified in the figure may be connected to the wide area network 103 or the local network 106.

The DNS server 101 utilizes a DNS protocol to execute normal name resolution tasks. The Web server 102 connected to the wide area network provides contents according to requests from the terminal 107. The term contents as used here, refers for example to information such as moving images, still images, text, and audio, etc.

The DNS proxy 104 executes name resolution processing when the terminal 107 sends a name resolution request. More specifically, when a host name shown in a name resolution request matches the host name specified by the management server 108, the DNS proxy 104 generates an IP address, and sends that generated IP address to the terminal 107 as a reply to the name resolution request.

The host name as referred to here is a character string denoting the name of the server device and for example is the "www.example.org" section in the URL "http://www.example.org/ex/1". The IP address generated by the DNS proxy 104 here is an IP address utilized only in the gateway system of the present embodiment.

The DNS proxy 104 more specifically calculates the hash value from the host name using a pre-issued address generating function, and generates an IP address based on that calculated hash value. The address generating function is described in detail later on using FIG. 2B. The structure of the DNS proxy 104 is described in detail later on using FIG. 3.

Based on the IP address that was sent, the terminal 107 transfers the content acquisition request to the Web proxy 105 assigned to that IP address.

If the host name does not match the host name specified by the management server 108, then the DNS proxy 104 transfers (or forwards) the name resolution request to the DNS server 101. The DNS server 101 sends the actual IP address of the Web server 102 corresponding to the host name to the terminal 107 in reply to the name resolution request.

The Web proxy 105 acquires the requested contents from the Web server 102 based on the content acquisition request sent from the terminal 107, and caches the acquired contents. The Web proxy 105 then sends the acquired contents to the terminal 107. A pre-assigned IP address range was allotted to the Web proxy 105 by the management server 108 and so the content acquisition request is sent to the assigned Web proxy 105 according to the IP address.

The management server 108 controls the IP addresses allotted to the Web proxies 105. The management server 108 specifies host names that were converted to IP addresses by the DNS proxy. The Web proxy 105 caches only the contents in Web server 102 that correspond to the specified host name.

The management server 108 contains an address assignment table 200 (See FIG. 2A), an address generating function 210 (See FIG. 2B) as well as an applicable domain name table 220 (See FIG. C).

FIG. 2A is a drawing for describing the structure of the address assignment table 200 contained in the management server 108 of the first embodiment of this invention.

The address assignment table 200 is a table showing the IP address range assigned to each Web proxy 105. The address assignment table 200 includes a server ID 201, a start address 202 and an end address 203.

The server ID 201 is an identifier for identifying the server device (Web proxy 105). The start address 202 is a start address within the address range allotted to the Web proxy 105 specified by the server ID 201. The end address 203 is an end address within the address range. The IP address range assigned to a certain Web proxy 105 here need not be one continuous range and may be divided into a number of ranges provided that range does not overlap onto IP address ranges assigned to other Web proxies 105.

The management server 108 may utilize automatic settings to uniformly divide a pre-established address range and allot these uniformly subdivided address ranges to the Web proxy 105. Moreover, the administrator may set the address range assigned to each Web proxy according to the gateway system load status.

FIG. 2B is a drawing for describing the address generating function 210 contained in the management server 108 of the first embodiment of the present invention.

The address generating function 210 is a function for generating IP addresses from variable length data X such as character strings, and includes the hash function 215. When variable length data X is input, the address generating function 210 utilizes the hash function 215 to convert that variable length data X that was input for example into 64 bit hash values. The function then generates an IP address in IPv6 (Internet Protocol version 6) by joining the specified 64 bit IPv6 prefix with the converted 64 bit hash value, and outputs that generated IP address.

An algorithm such as SHA1 (Secure Hash Algorithm 1) may for example be utilized for the hash function. Besides SHA1, algorithms such as MD5 (Message Digest Algorithm 5) may be utilized.

In this embodiment, the host name (such as "www.example.org") for the Web server 102 may be utilized for the variable length data X input to the address generating function 210.

FIG. 2C is a drawing for describing the structure of the applicable domain name table 220 contained in the management server 108 of the first embodiment of the present invention.

The domain name table 220 is utilized to decide whether or not to convert the host name specified in the name resolution request to an IP address in the name resolution processing. This domain name table 220 includes for example a domain name (host name) 221 and conversion item 222.

The domain name (host name) 221 is a host name for Web server 102 that provides contents to the terminal 107. The conversion item 222 stores the information showing whether or not to convert the domain name (host name) shown in domain name 221 to an IP address.

The DNS proxy 104 executes the name resolution processing by using the address generating function 210 and the domain name table 220. The name resolution processing executed by the DNS proxy 104 is described in detail later on using FIG. 4.

The management server 108 distributes the address generating function 210 and the domain name table 220 to the DNS proxy 104. The management table 108 distributes the address generating function 210 to the Web proxies 105. The management server 108 makes an assigned IP address table 600 (See FIG. 6A) showing the IP address range assigned to the Web proxies 105 based on the address assignment table 200, and distributes the assigned IP address table 600 that was made, to the Web proxies 105.

Figure 3:
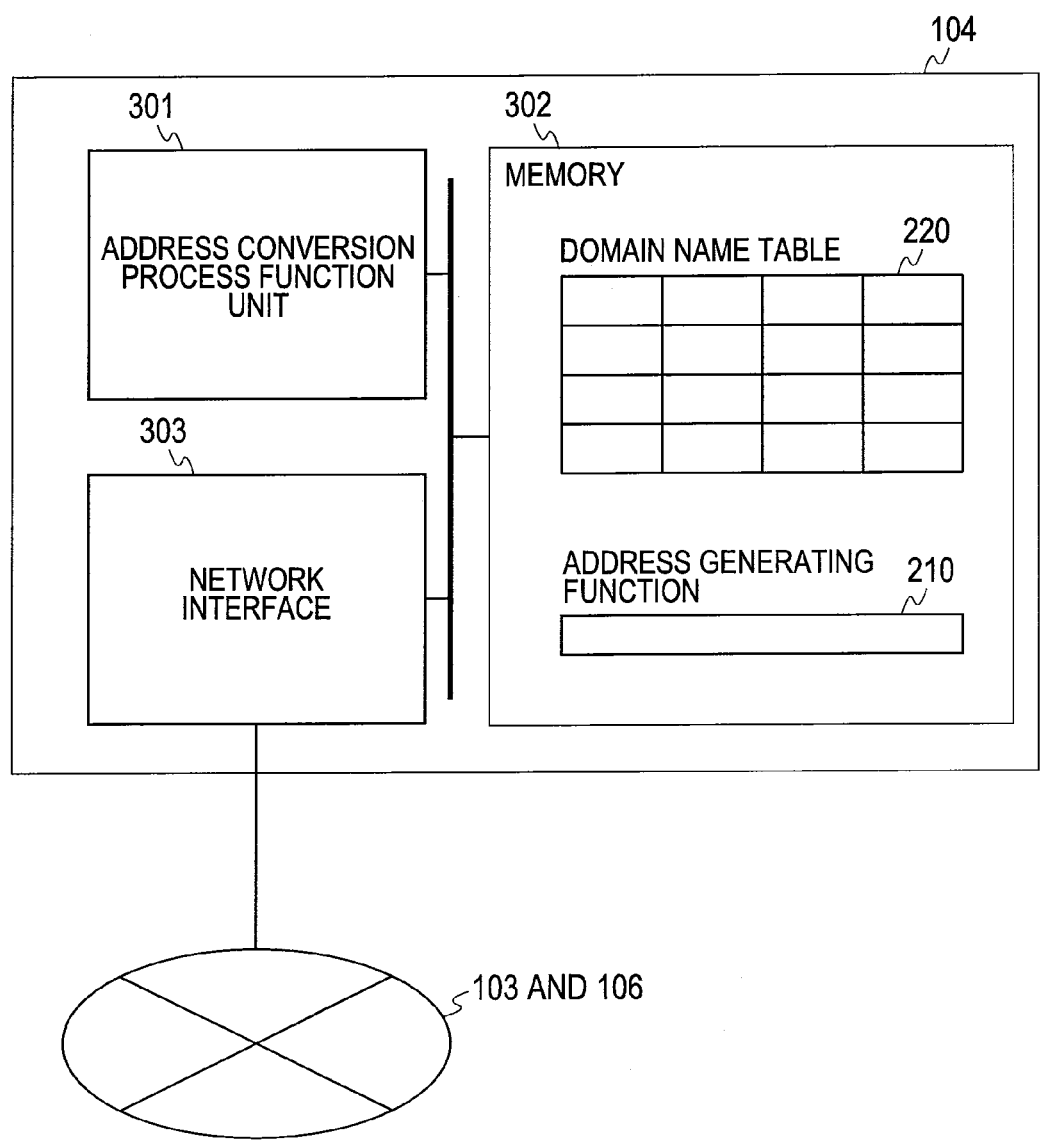
FIG. 3 is a block diagram showing the structure of the DNS proxy of the first embodiment of this invention.

FIG. 3 is a block diagram showing the structure of the DNS proxy 104 of the first embodiment of this invention.

The DNS proxy 104 contains an address conversion processor unit 301, a memory 302, and a network interface 303. The DNS proxy 104 connects to the wide area network 103 and the local network 106.

The memory 302 stores the domain name table 220 and the address generating function 210 distributed from the management server 108.

The address conversion processor unit 301 performs processing such as address conversion using the address generating function 210 and the domain name table 220 stored in the memory 302. The processing executed by the address conversion processor unit 301 is described in detail later on using FIG. 4. A processor not shown in the drawing, runs each program stored in the memory 302 to execute processing in the address conversion processor unit 301.

The network interface 303 is an interface for connecting the DNS proxy 104 to the wide area network 103 and the local network 106.

Figure 4:
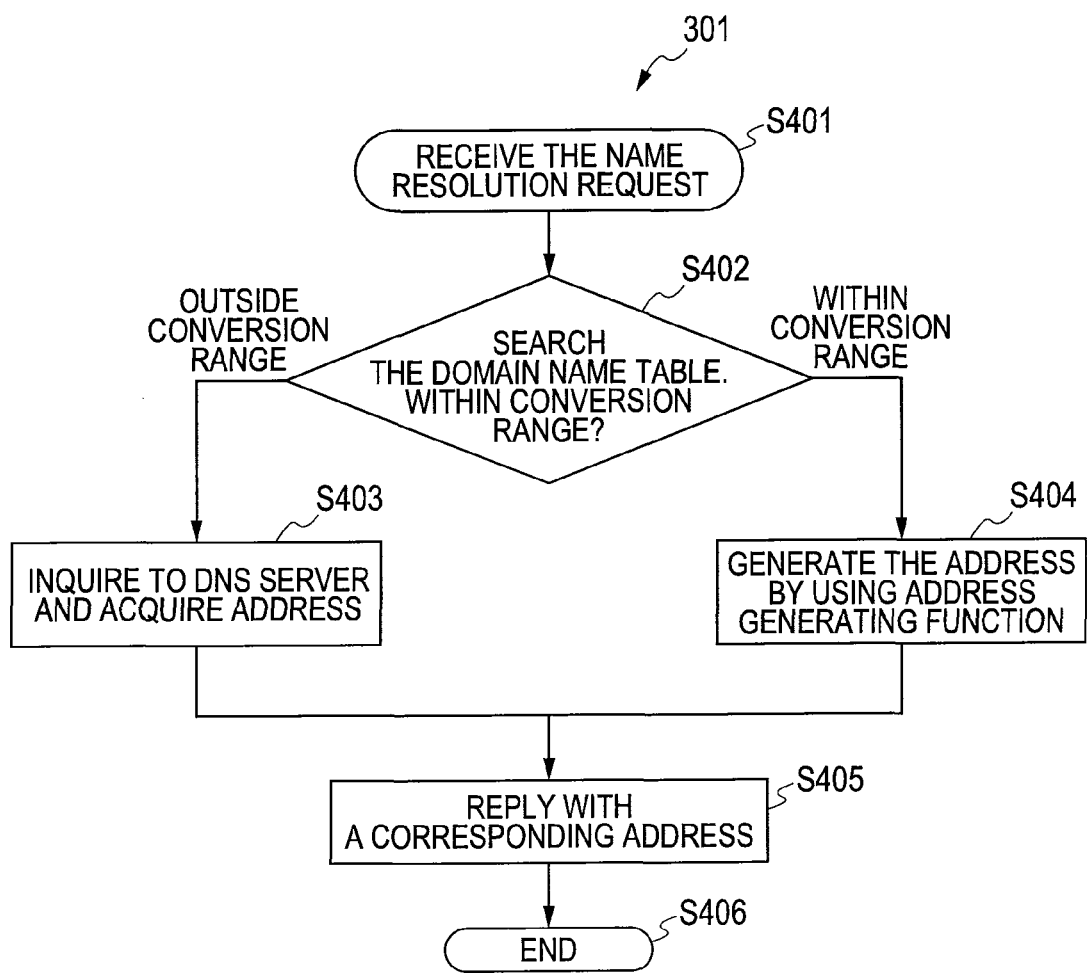
FIG. 4 is a flowchart showing the process for name resolution processing executed by the DNS proxy of the first embodiment of this invention.

FIG. 4 is a flowchart showing the process for resolving the name by the DNS proxy 104 of the first embodiment of this invention.

In this process, first of all the address conversion processor unit 301 in the DNS proxy 104 receives a name resolution request (such as "AAAA? www.examle.org") that was sent from the terminal 107 (S401). After receiving the name resolution request, the address conversion processor unit 301 searches the domain name table 220, and decides whether or not to convert the host name (such as "www.example.org") shown in the name resolution request to an IP address (S402).

If decided in S402 not to convert the host name, then the DNS proxy 104 transfers the name resolution request sent from the terminal 107 to the DNS server 101 by way of the wide area network 103.

The DNS server 101 that provides a domain name service, executes the usual name resolution, and sends the actual IP address corresponding to the host name to the requesting party which is the DNS proxy 104, as a reply to the name resolution request. The DNS proxy 104 receives a reply to the name resolution request sent from the DNS server 101, and acquires the actual IP address corresponding to the host name (S403).

However, when decided in S402 that the host name can be converted, the address conversion processor unit 301 in the DNS proxy 104 utilizes the address generating function 210 to calculate the hash value (such as, "41de:3297:ec18:5fae") from the host name (for example, "www.example.org") shown by the name resolution request, and combines the calculated hash value with the specified IPv6 prefix (such as, "2001:db8::") to generate the IP address (for example, "2001:db8::41de:3297:ec18:5fae") (S404). Here, the generated IP address is the IP address utilized in the gateway system of the present embodiment, and corresponds to the Web proxy 105 that caches the Web server 102 contents.

Next, the address conversion processor unit 301 sends the actual IP address acquired from the DNS server 101 or the IP address generated by the address generating function 210 to the terminal 107 as a reply (for example, "AAAA 2001:db8::41de:3297:ec18:5fae") to the name resolution request (S405).

Figure 5:
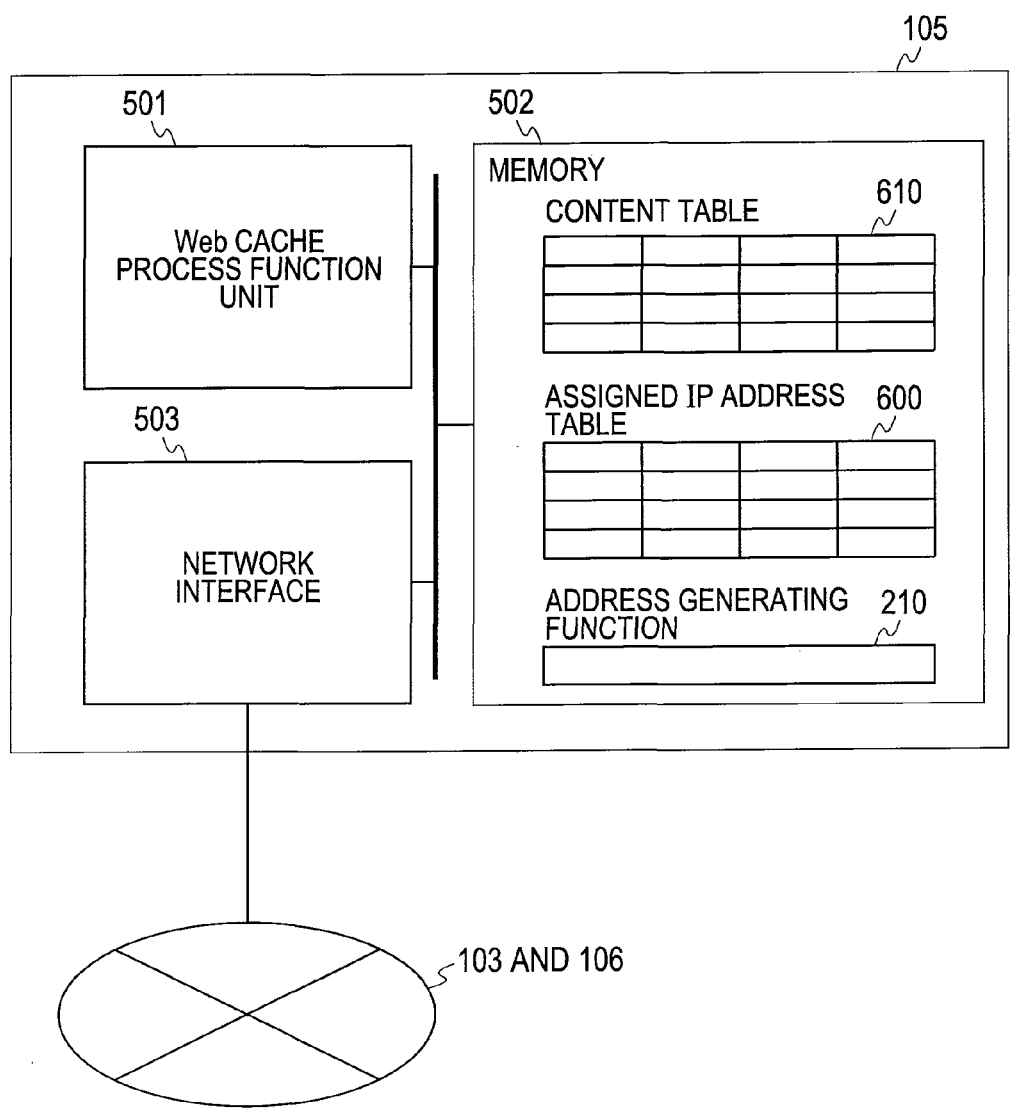
FIG. 5 is a block diagram showing the structure of the Web proxy of the first embodiment of this invention.

FIG. 5 is a block diagram showing the structure of the Web proxy 105 of the first embodiment of this invention.

The Web proxy 105 contains a Web cache process function unit 501, a memory 502, and a network interface 503. The Web proxy 105 connects to the wide area network 103 and the local network 106.

The memory 502 contains the assigned IP address table 600 and the contents table 610, and may also contain an address generating function 210 if needed.

The assigned IP address table 600 is described in detail later on using FIG. 6A. The content table 610 is described in detail later on using FIG. 6B. The address generating function 210 is the same as the function shown in FIG. 2B, and is distributed by the management server 108 as required.

The Web cache process function unit 501 utilizes the address generating function 210, the assigned IP address table 600, and the content table 610 stored in the memory 502 to acquire the requested contents from the Web server 102 based on the content acquisition request sent from the terminal 107, and to cache those acquired contents. The processing executed by the Web cache process function unit 501 is described in detail later on using FIG. 7. The Web cache process function unit 501 processing is executed by a processor not shown in the drawing that runs the respective programs stored in the memory 502.

The network interface 503 is an interface for connecting the Web proxy 105 to the wide area network 103 and the local network 106. The Web proxy 105 registers the IP address set in the assigned IP address table 600 as an IP address for its own device into the network interface 503. The Web proxy 105 can in this way receive content acquisition requests sent from the terminal 107.

The Web proxy 105 in this embodiment includes a Web cache processing function. However the Web proxy 105 may contain for example a filter function or a content conversion function instead of the Web cache processing function. The gateway system of this embodiment can in this way also be applied not only to cache systems but also to systems providing other services.

FIG. 6A is a drawing showing the structure of the contents protocol contained in the Web proxy 105 of the first embodiment of this invention.

The assigned IP address table 600 is a table for describing the range of the assigned IP address table 600 managed by one Web proxy 105. The assigned IP address table 600 includes a start address 601 and an end address 602.

The management server 108 may distribute the assigned IP address table 600 or the table 600 may be formed by the Web proxy 105 based on the IP address range notified by the management server 108.

The Web proxy 105 registers all IP addresses to which the applicable Web proxy is assigned into the network interface 503, and receives content acquisition requests having a registered IP address as their destination. The content acquisition processing executed by the Web proxy 105 is described later on using FIG. 7.

After receiving an address resolution request for an IP address it manages, the Web proxy 105 informs the terminal 107 and adjacent routers of the MAC (Media Access Control) address set in its own device. The address resolution request as referred to here, is for example an ARP (Address Resolution Protocol) when using IPv4, and is a ND (Neighbor Discovery) protocol when using IPv6.

FIG. 6B is a drawing for describing the structure of the contents table 610 contained in the Web proxy of the first embodiment of this invention.

The content table 610 is a table for storing contents cached by the Web proxy 105. The content table 610 for example stores the URL 611, destination IP address 612, content 613, and metadata 614.

The URL 611 is the URL for the content acquisition destination. The destination IP address 612 is the destination IP address shown in the content acquisition request, and is the IP address generated from the host name of Web server 102 serving as the content acquisition destination by the DNS proxy 104.

The content 613 contains the contents acquired by the Web proxy 105 from the Web server 102. The metadata 614 is for example the acquired content size, date and time, and storage period, etc.

Figure 7:
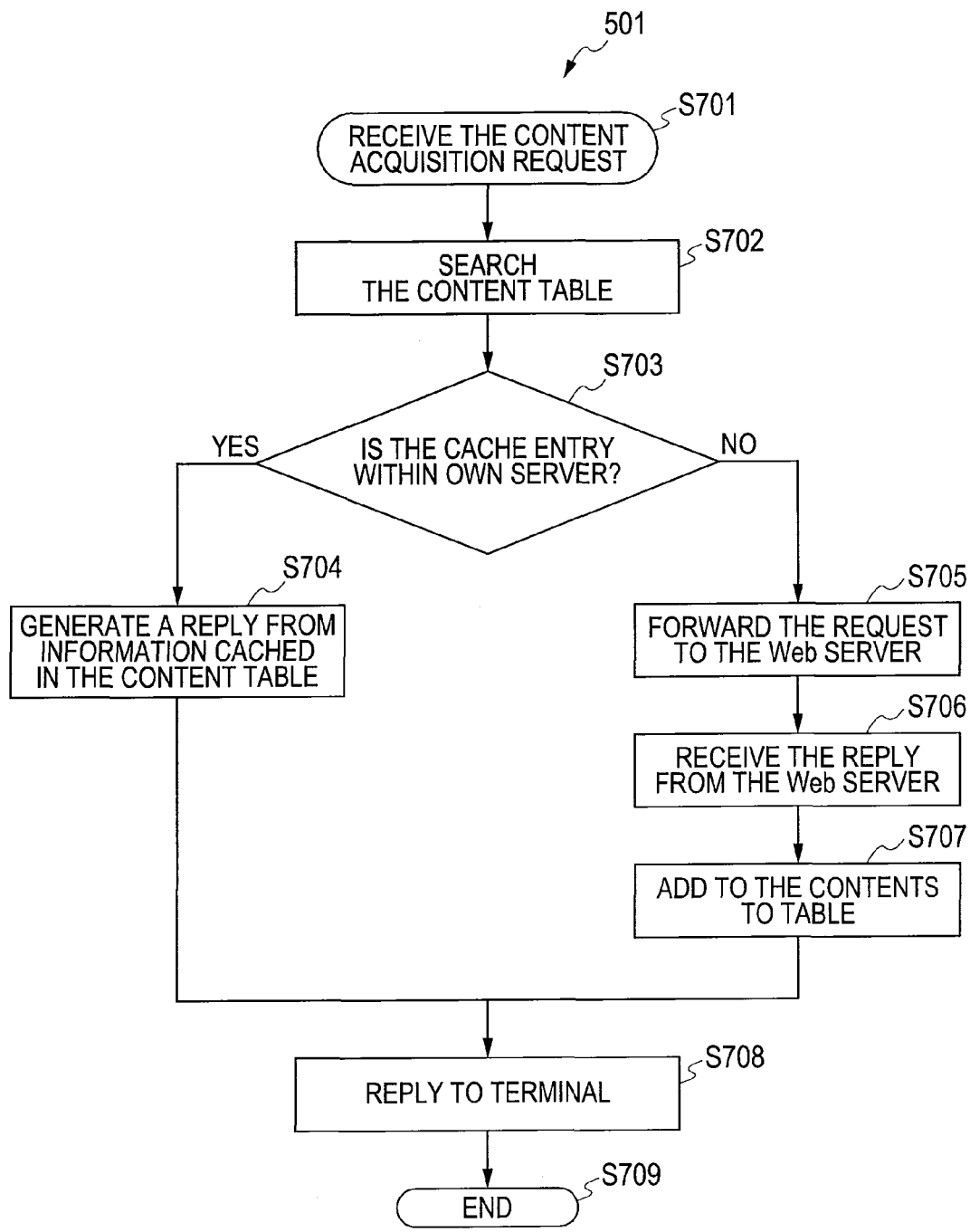
FIG. 7 is a flow chart showing the process for acquiring the contents processed by the Web proxy of the first embodiment of this invention.

FIG. 7 is a flow chart showing the process for acquiring the contents contained in the Web proxy of the first embodiment of this invention.

In this process, the Web proxy 105 first of all receives the content acquisition information request that was sent from the terminal 107 (S701). Next, the Web cache process function unit 501 in the Web proxy 105 searches the content table using the URL of the Web server 102 which is the content acquisition destination, as the search key (S702), and decides whether or not there is an entry matching the search key (S703).

When the Web proxy decides in S703 that there is an entry matching the search key, those requested contents are in a cache, so the Web cache process function unit 501 acquires the contents stored in the content 613 of the entry that matches the search key, and forms a reply to the content acquisition request that includes the requested contents (S704).

However, when the Web proxy 105 decides in S703 that there is no entry matching the search key, then the requested contents are not cached so the Web cache process function unit 501 transfers the content acquisition request sent from the terminal 107 to the Web server 102 (origin server) storing the applicable contents (S705).

The Web proxy 105 in this case executes the usual name resolution in order to acquire the IP address for Web server 102 which is the content acquisition destination. More specifically, the Web proxy 105 sends a name resolution request to the DNS server 101, and receives an actual IP address corresponding to the host name of Web server 102 (which is the content acquisition destination) as a reply from the DNS server 101 to the name resolution request. The Web proxy 105 can in this way transfer the content acquisition request to the Web server 102.

The Web proxy 105 adds the new entry to the content table 610, and respectively stores the URL and destination IP address for the content acquisition destination shown via the content acquisition request sent from the terminal 107, into the newly added URL 611 and IP address 612 entries.

Next, the Web cache process function unit 501 receives a reply to the content acquisition request sent from the Web server 102 (S706). After a reply is received to the content acquisition request, the Web cache process function unit 501 acquires the contents from that reply, and stores the acquired content and content information respectively in the new entries for the content 613 and metadata 614 that were newly added to content table 610. The Web cache process function unit 501 forms a reply to the content acquisition request that includes the acquired content (S707).

Finally, the Web cache process function unit 501 sends a reply to the content acquisition request made in step S704 or S707 (S708) and ends the processing (S709).

In another exemplary embodiment of this embodiment, the gateway system may include an address converter device at a pre-stage of the Web proxy 105. In this case, the management server 108 for example distributes the address assignment table 200 shown in FIG. 2A to the address converter device. The address converter device is also notified of the key IP address set in the Web proxy 105.

The address converter device includes a server ID (ID for Web proxy) listed in the address assignment table 200, and an address conversion table linked to the notified proxy IP address for Web proxy 105. The address converter device in this way rewrites the destination IP address in the content acquisition request sent from the terminal 107, onto the key IP address from the IP address that was generated based on the hash value. The address converter device then transfers the content acquisition request to the Web proxy 105 corresponding to the proxy IP address.

In another version of this embodiment, after acquiring contents from the Web server 102 in step S707, the Web proxy 105 may utilize the address generating function 210 distributed from the management server 108, to generate an IP address from the host name for Web server 102, and store the generated IP address into the destination IP address 612 for the new entry that was added to the content table 610.

A gateway system including an address converter device may be utilized when assigning a vast number of IP addresses to the Web proxy 105 is not practical in terms of cost effectiveness. This gateway system balances the load based on layer 4 information and so operation is faster and less expensive than gateway systems that balance the load based on information in the layer 7.

The content table 610 formed in the above processing easily specifies contents that were cached by the web proxies 105. These formed content tables 610 can also be used in the assignment change processing shown in FIG. 10 and FIG. 11 as described later on. The movement source Web proxy 105 moves entries with contents for the content table 610, to the Web proxy 105 that is the movement destination.

Figure 8:
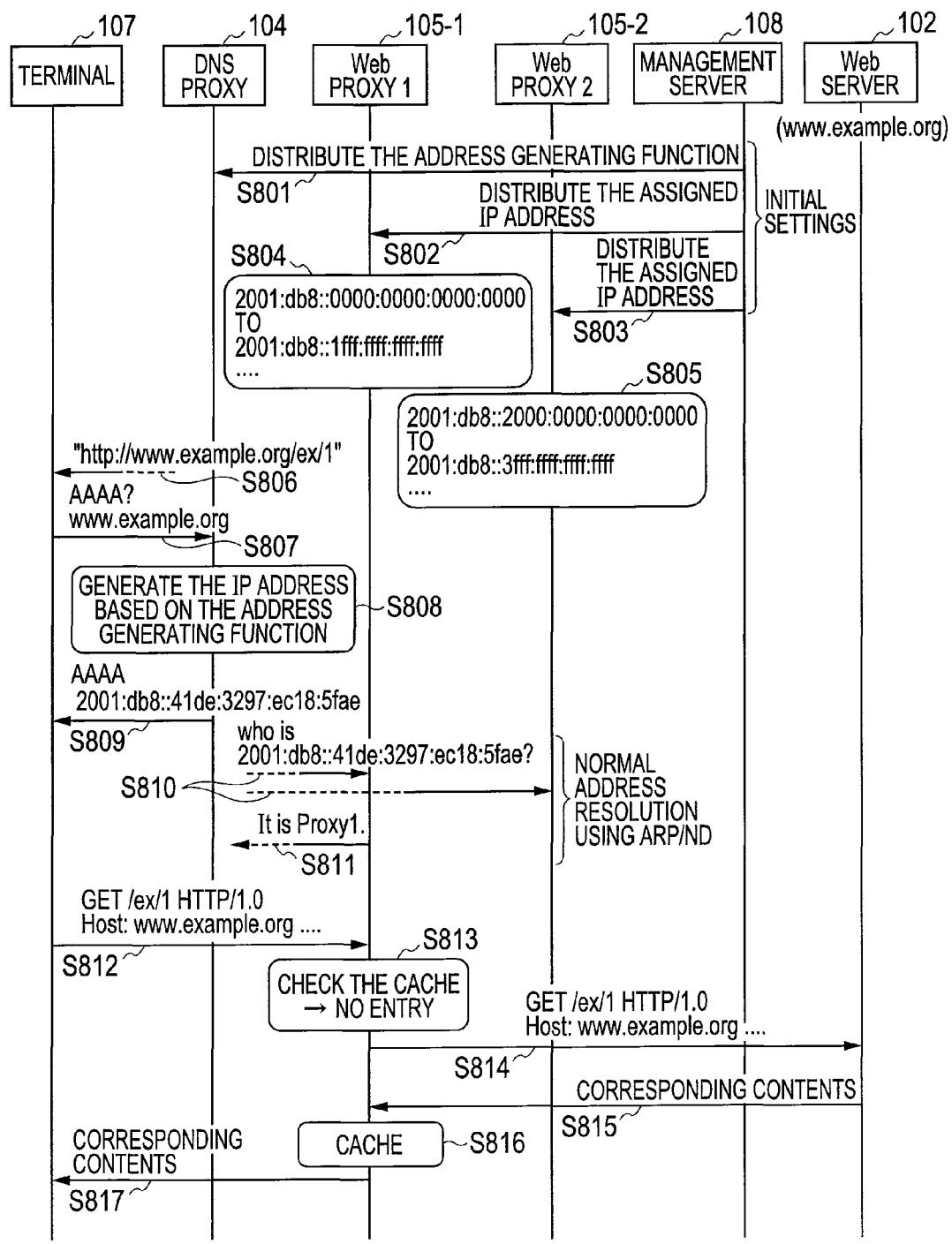
FIG. 8 is a sequence diagram showing the process for acquiring the contents contained in gateway system of the first embodiment of this invention.

FIG. 8 is a sequence diagram showing the process for acquiring the contents contained in gateway system of the first embodiment of this invention.

The Web server 102 shown in the example in FIG. 8 is a server device to which for example the host name "www.example.org" is attached.

Firstly, the management server 108 distributes the address generating function 210 and the domain name table 220 to the DNS proxy 104 (S801). The management server 108 also distributes the address generating function 210 and the address assignment table 200 (or the assigned IP address table 600) to the Web proxy 105-1 and the Web proxy 105-2 (S802, S803).

Next, after receiving the assigned IP address table 600, the Web proxy 105 registers all IP addresses contained in the assigned IP address table 600 into the network interface 503 as IP addresses assigned to its own device, (S804, S805).

Next, when for example a URL (such as "http://www.example.org/ex/1") that was input by the user is received (S806), the terminal 107 sends a content acquisition request for accessing this URL and acquiring the contents. In this case, the terminal 107 first of all sends for example a name resolution request (such as, "AAAA? www.example.org") to the DNS proxy 104 in order to acquire an IP address corresponding to the host name (for example, "www.example.org") (S807).

After receiving a name resolution request sent from the terminal 107, the DNS proxy 104 searches the applicable domain name table 220 and decides whether or not the host name (for example, "www.example.org") shown by the received solution request can be converted. If decided that the applicable host name can be converted then the DNS proxy 104 uses the address generating function 210 to generate an IP address from the applicable host name (S808).

The DNS proxy 104 next sends the generated IP address (for example, "2001:db8::41de:3297:ec18:5fae") to the terminal 107 as a reply to the name resolution request (S809).

After receiving a reply to the name resolution request, the terminal 107 acquires the IP address corresponding to the applicable host name from the received reply, and after setting the acquired IP address in the destination address for the content acquisition request, sends the content application request (S812). The TCP connection is now established.

More specifically, the content acquisition request is routed as an IP packet on IP routers along the path according to the destination IP address, and sent to one of the Web proxies 105 assigned to the applicable IP address. In this case, devices such as the terminal 107 and the IP routers along the path search devices where the applicable IP address is registered in order to execute the usual address resolution (ARP, ND, etc.) (S810). The device (for example, Web proxy 1_105-1) that received an address resolution request addressed to itself, notifies the requesting party (IP router along path, terminal 107, etc.) of its own device MAC address (S811). The TCP connection between for example the terminal 107 and the Web proxy 1_105-1 is established in this way, and the Web proxy 1_105-1 can receive content acquisition requests that are addressed to the applicable IP address.

Next, after receiving a content acquisition request from the terminal 107, the Web proxy 1_105-1 acquires the URL (for example, "http://www.example.org/ex/1") for the content application request from the content application request (for example, "GET/ex/1 HTTP/1.0 Host: www.example.org - - -") (S812).

The Web proxy 1_105-1 then searches the content table 610 using the acquired URL as the search key, and decides whether or not the requested contents have been cached. If decided here that the requested contents have not been cached (S813), then the Web proxy 1_105-1 forwards the content acquisition request sent from the terminal 107 to the Web server that stored the contents (S814).

After receiving the content acquisition request, the Web server 102 sends a reply containing the contents requested in the content acquisition request to the Web proxy 1_105-1 (S815).

After receiving a reply to the content acquisition request, the Web proxy 1_105-1 acquires the contents from the reply that was received, caches the applicable acquired contents (S816), and sends them to the terminal 107 as a reply to the content acquisition request (S817).

The above process allows the Web proxies 105 to cache the contents of the Web server 102 containing the host name linked to the assigned IP address. The gateway system of this embodiment in other words ensures that contents belonging to the same host name will be cached by the same Web proxy. Correct caching in ensured because IP addresses generated from host names based on the hash values are linked to any of the Web proxies 105.

The process for changing the assigned IP address range of the Web proxy 105 in the present embodiment is described next. In this process, the management server 108 can change the assigned IP address range of the Web proxies 105, when a certain number of the Web proxy units are scheduled to stop operation or when the load is improperly balanced.

Figure 9:
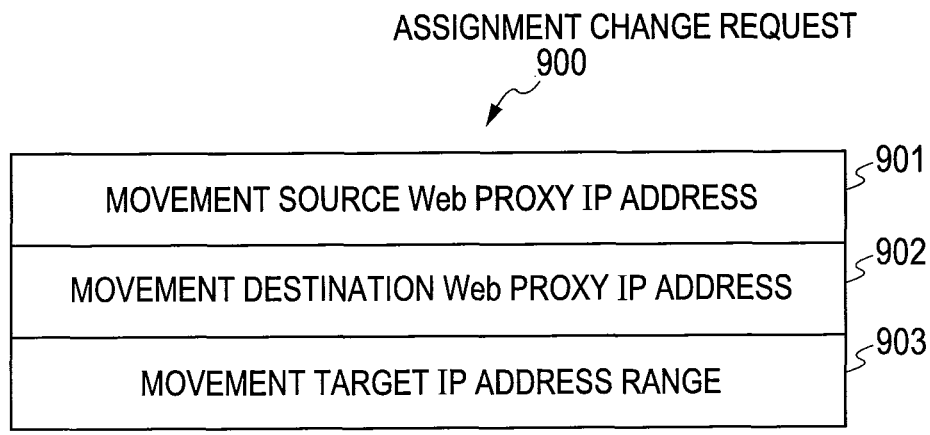
FIG. 9 is a drawing for describing the format of assignment change requests in the first embodiment of this invention.

FIG. 9 is a drawing for describing the format of assignment change requests in the first embodiment of this invention.

An assignment change request 900 includes a movement source Web proxy IP address 901, a movement destination Web proxy IP address 902, and a movement target IP address range 903.

To change the IP address range assigned to the Web proxies 105, the management server 108 sends the assignment change request 900 to all Web proxies 105, or to movement source and movement destination Web proxies 105.

Figure 10:
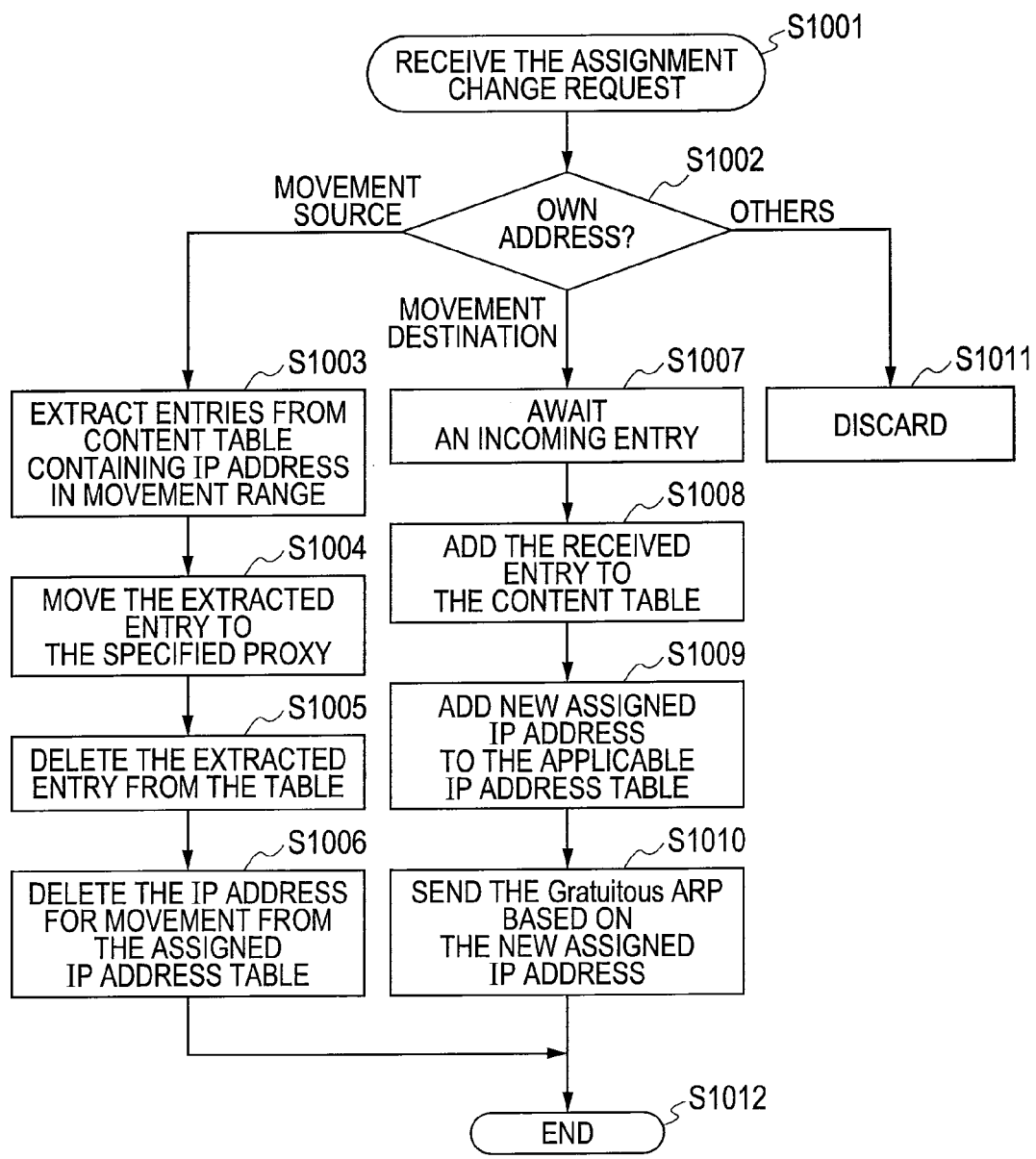
FIG. 10 is a flow chart showing the processing for changing assignments executed by the Web proxy of the first embodiment of this invention.

FIG. 10 is a flow chart showing the processing for changing assignments as executed by the Web proxy 105 of the first embodiment of this invention.

After a Web proxy 105 receives an assignment change request 900 sent from the management server 108 (S1001), the Web proxy 105 decides whether or not any of the movement source Web proxy IP address 901 and the movement destination Web proxy IP address 902, matches the IP address assigned to its own device (S1002).

If the Web proxy 105 decides in step S1002 that the movement source Web proxy IP address 901 matches the IP address of its own device then the Web proxy 105 that received the assignment change request 900 is the movement source Web proxy, so that movement source Web proxy extracts the entry from content table 610 corresponding to the IP address specified in the movement target IP address range 903 (S1003).

The movement source Web proxy then moves that extracted entry to the content table of the movement destination Web proxy specified by the movement destination Web proxy IP address 902 (S1004).

The movement source Web proxy in this case may delete for example data from the content 613 and the metadata 614 from the extracted entry from the content 613 as needed, and send just the URL 611 and destination IP address 612 data to the movement destination Web proxy. The traffic between the Web proxies 105 can in this way be reduced in the assignment item request processing.

The movement source Web proxy next deletes entries matching the IP address specified by the movement target IP address range 903 (S1005). Moreover, the movement source Web proxy deletes the IP address range specified by the movement target IP address range 903, and deletes the applicable IP address registered in the network interface 503 (S1006).

However when the IP address 902 for the movement destination Web proxy was decided to match the IP address of the Web proxy's own device in step S1002, then that Web proxy 105 is the movement destination Web proxy so the movement destination Web proxy waits to receive movement target entries sent from the movement source Web proxy (S1007).

After receiving the movement target entries, the movement destination Web proxy adds the received entries to the content table 610 (S1008). The movement destination Web proxy also adds the IP address designated by the movement target IP address range 903 serving as the IP address movement range, to the assigned IP address table 600 (S1009). The movement destination Web proxy also stores (registers) the newly added IP address into the network interface 503.

The movement destination Web proxy also sends a neighbor advertisement packet or a Gratuitous ARP (S1010). The movement destination Web proxy can in this way notify the neighboring IP routers, terminal 107, Web proxy 105, and management server 108 where the address has been assigned. After receiving the neighbor advertisement packet or a Gratuitous ARP, the neighboring IP router, terminal 107 and so on once again send an address resolution request, and acquire the MAC address of the network interface where the new IP address was registered.

However when decided in step S1002 that the movement source Web proxy IP address 901 and the movement destination Web proxy IP address 802 do not match the IP addresses in the Web proxy's own device, then that assignment change request is not a message for its own device so the Web proxy 105 discards that message (S1011). The movement source and movement destination Web proxies can in this way correctly receive the assignment change request that was sent, even when the assignment change request was sent to all Web proxies 105 by multicast.

Figure 11:
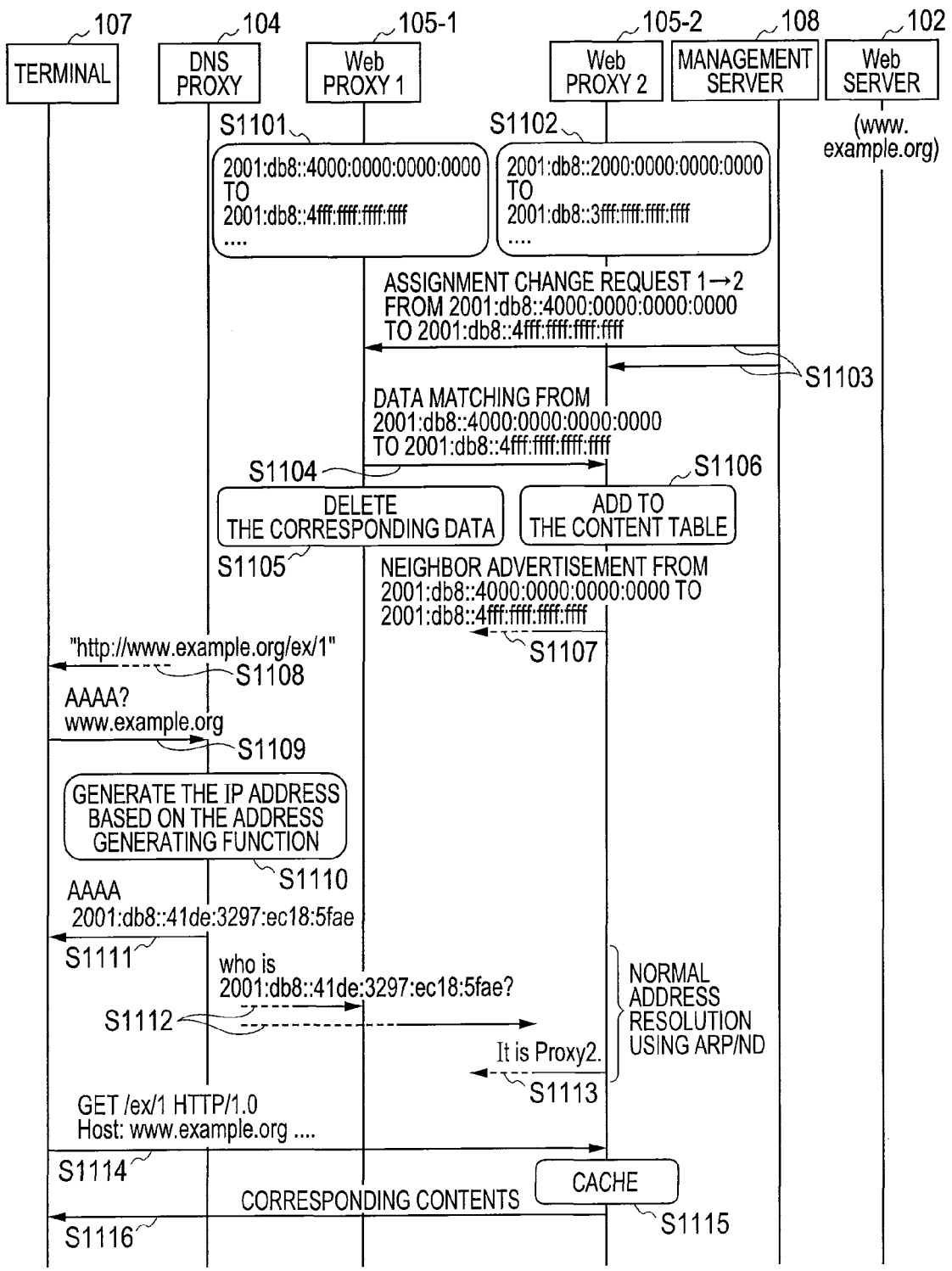
FIG. 11 is a sequence diagram showing the processing for changing assignments in the gateway system of the first embodiment of this invention.

FIG. 11 is a sequence diagram showing the processing for changing assignments in the gateway system of the first embodiment of this invention.

In the initial setting, the Web proxy 1_105-1 is assigned for example, a range of IP addresses from "2001:db8::4000:0000:0000:0000" to "2001:db8::4ff:ffff:ffff:ffff:" and caches the contents corresponding to the assigned IP address (S1101).

The Web proxy 2_105-2 is for example assigned a range of IP addresses from "2001:db8::3fff:ffff:ffff:ffff" to "2001:db8::4000:0000:0000:0000" and caches the contents corresponding to the assigned IP address (S1102).

The management server 108 next sends instruction for example to move the assigned contents of the Web proxy 1_105-1 that match the range from "2001:db8::4000:0000:0000:0000" to "2001:db8::4ff:ffff:ffff:ffff" to the Web proxy 2_105-2 to each of the Web proxies specified for movement (S1103).

After receiving instructions from the management server 108 to move the contents, the Web proxy 1_105-1, extracts the entry corresponding to the specified IP address range from the content table 610, and transfers that extracted entry to the Web proxy 2_105-2 which is the movement destination (S1104). The Web proxy 1_105-1 then deletes applicable entry from the content table 610. The Web proxy 1_105-1 then deletes the specified IP address from the assigned ID address table 600 and/or also deletes the specified IP address from the network interface 503 (S1105).

The Web proxy 2_105-2 on the other hand, adds the entry moved from the movement source Web proxy 1_105-1, to the content table 610. The Web proxy 2_105-2 then adds the range of the specified IP address to the assigned IP address table 600 or registers the added IP address range to the network interface 503 (S1106).

The Web proxy 2_105-2 next notifies the neighboring terminal 107, the IP router and the Web proxy 105 and so on of the change in the assigned IP address range by sending a neighbor advertisement packet or a Gratuitous ARP (S1107). The neighboring terminal 107, the IP router, and so on in this way resend an address resolution request addressed to the IP address shown in the neighbor advertisement packet or a Gratuitous ARP in order to acquire the MAC address corresponding to the applicable IP address.

The processing from here onwards from steps S1108 to S1116 is the same as the processing from steps S806 to S817 shown in FIG. 8.

The gateway system in the first embodiment as described above, achieves uniform load balancing because the gateway system transfers content acquisition requests to the Web server, from the terminal to the appropriate Web proxy according to the IP address generated from the hash value. The storage capacity can also be extended on a scalable level. Moreover, no load balancer device is required so the cost of managing the gateway system can be reduced and the gateway system rendered more resistant to problems.

Further, if the load on the Web proxies becomes unbalanced, and there is a change in the IP address range assigned to the Web proxies (in other words, the cache contents were moved), then the gateway system exchanges only the information between the Web proxies, and does not exchange information between other devices such as the DNS proxy and terminals. The processing required for changing the assigned IP address can therefore be reduced.

The DNS proxy that performs name resolution does not control the Web proxy status. The DNS proxy can therefore be easily made redundant, and the gateway system can attain high reliability and high-speed operation.

The terminal utilizes the name resolution provided by the DNS proxy to access the Web proxy so there is no need to add a function to the terminal for accessing the Web proxy. The gateway system of this embodiment can therefore be easily utilized in environments where there are already numerous terminals.

Second Embodiment

The structure of the gateway system of the second embodiment is the same as the gateway structure of the first embodiment shown in FIG. 1. The structure of the DNS proxy of the second embodiment is the same as the structure of the DNS proxy of the first embodiment shown in FIG. 3. The structure of the Web proxy of the second embodiment is the same as the Web proxy of the first embodiment shown in FIG. 5.

Figure 14:
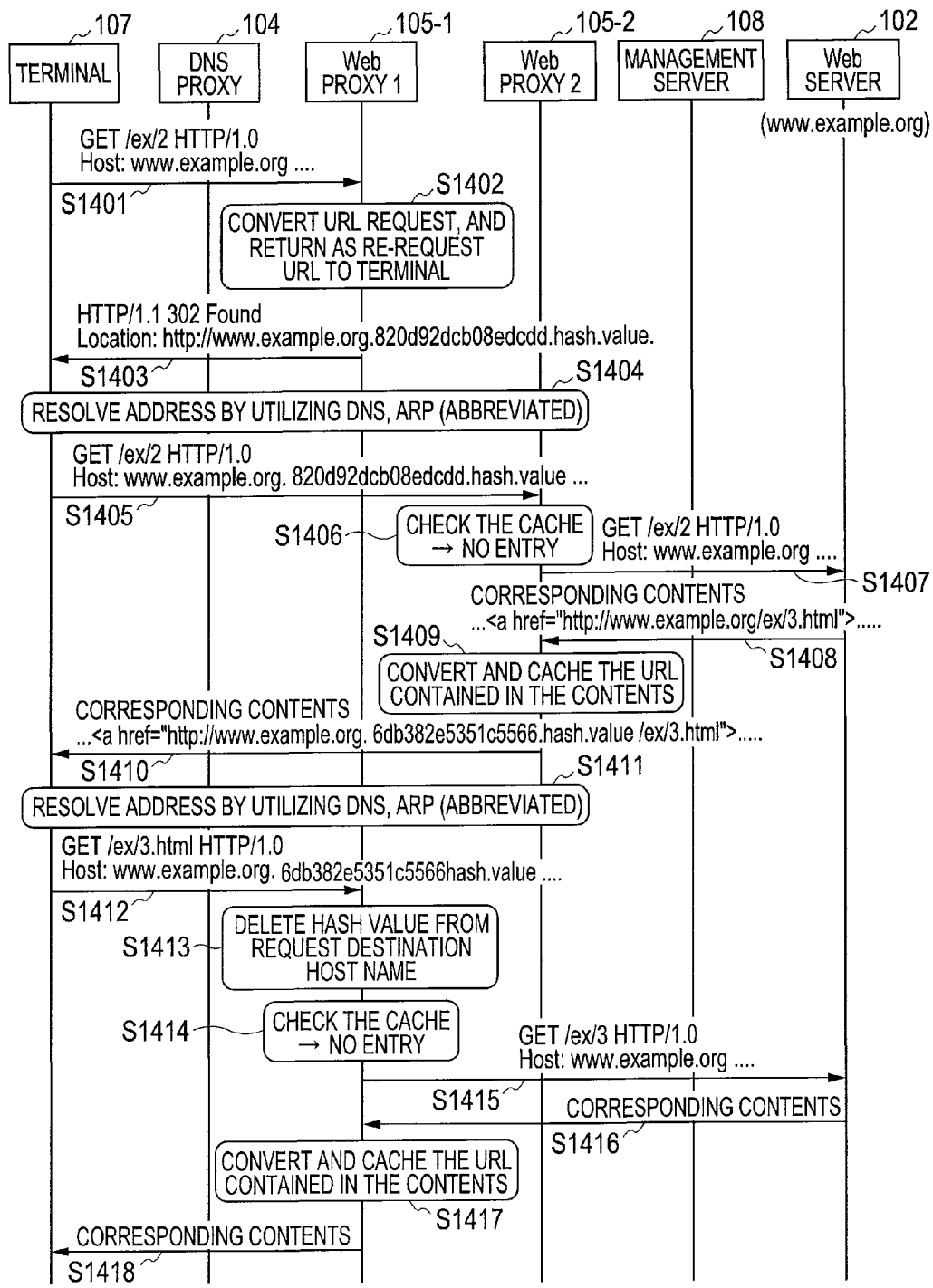
FIG. 14 is a sequence diagram showing the process for acquiring contents in the gateway system of the first embodiment of this invention.

However a portion of the processing in the address converter processor unit of the DNS proxy of the second embodiment is different from the processing of the address converter processor unit of the first embodiment (S1404 and S1412 in FIG. 14). Moreover, a portion of the processing in the Web cache process function unit of the Web proxy of the second embodiment is different from the processing in the Web cache process function unit of the first embodiment (S1402 in FIG. 14).

In the gateway system of the first embodiment, the DNS proxy 104 calculates the hash value from the host name for the content acquisition destination, and generates an IP address by using that calculated hash value. The content acquisition requests sent from the terminal 107 are therefore distributed into host name units.

Access requests sent to a Web server 102 (host) in the gateway system of the first embodiment are therefore received by a single Web proxy 105 so that if access is concentrated on the Web server 102, then load on the assigned Web proxy 105 becomes large, and an unbalanced load might possibly occur among the Web proxies 105.

Whereupon, in the gateway system of the second embodiment, the Web proxy 105 calculates the hash value from the entire URL at the content acquisition destination so that a URL embedding the calculated hash value as the host suffix is sent back to the terminal 107 as the content acquisition destination URL.

After receiving a name resolution request from the terminal 107, the DNS proxy 104 generates an IP address for the assigned Web proxy 105 from the host name containing the hash value. So content acquisition requests in the second embodiment are distributed to the Web proxies 105 based on the hash values generated from the entire URL.

In other words, the second embodiment avoids concentrating loads on a single Web proxy 105, because the contents are cached in multiple Web proxies 105 even if the contents have the same host name.

The second embodiment may be applied along with the first embodiment to cache systems, etc.

The rules for URL conversion in the second embodiment are described next.

Figure 12:
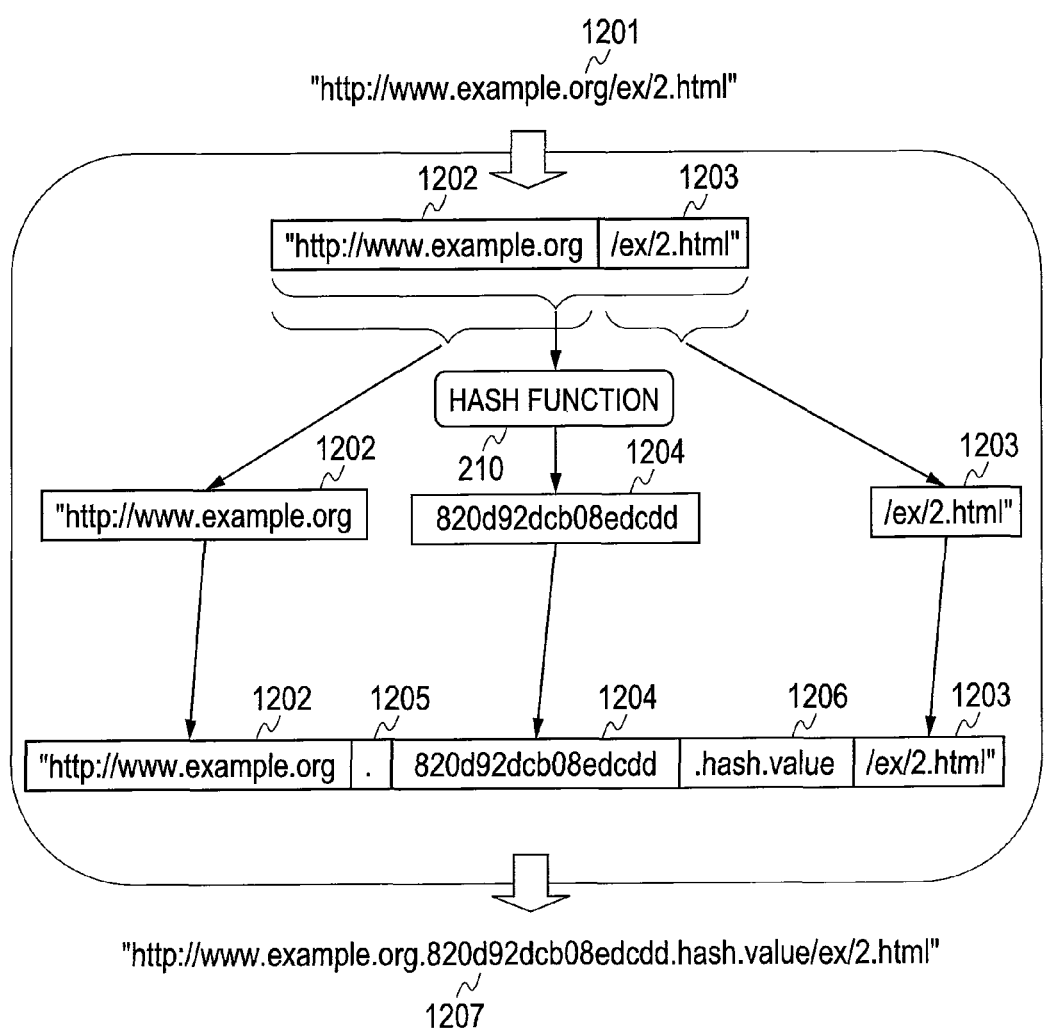
FIG. 12 is a drawing for describing the URL conversion rules in the second embodiment of this invention.

FIG. 12 is a drawing for describing the URL conversion rules in the second embodiment of this invention.

In this embodiment, the Web proxy 105 utilizes the address generating function 210 (hash function 215) stored in the memory 502 to generate a hash value 1204 (for example, "820d92dcb08edcdd") from the URL1201 (http://www.example.org/ex/2.html) including a host name and path name shown in the content acquisition request sent for example from the terminal 107.

The Web proxy 105 joins the section 1202 up to the URL host name (for example, http://www.example.org), and the period (.) 1205, and the hash value 1204 (for example, "820d92dcb08edcdd"), and the suffix 1206 of the host name (for example, ".hash.value"), and section 1203 from the URL host name onwards (for example, "/ex/4.html"). The URL1207 (for example, "http://www.example.org.820d92dcb08 edcdd.hash.value/ex/2.html") with an embedded hash value is generated in this way.

Figure 13:
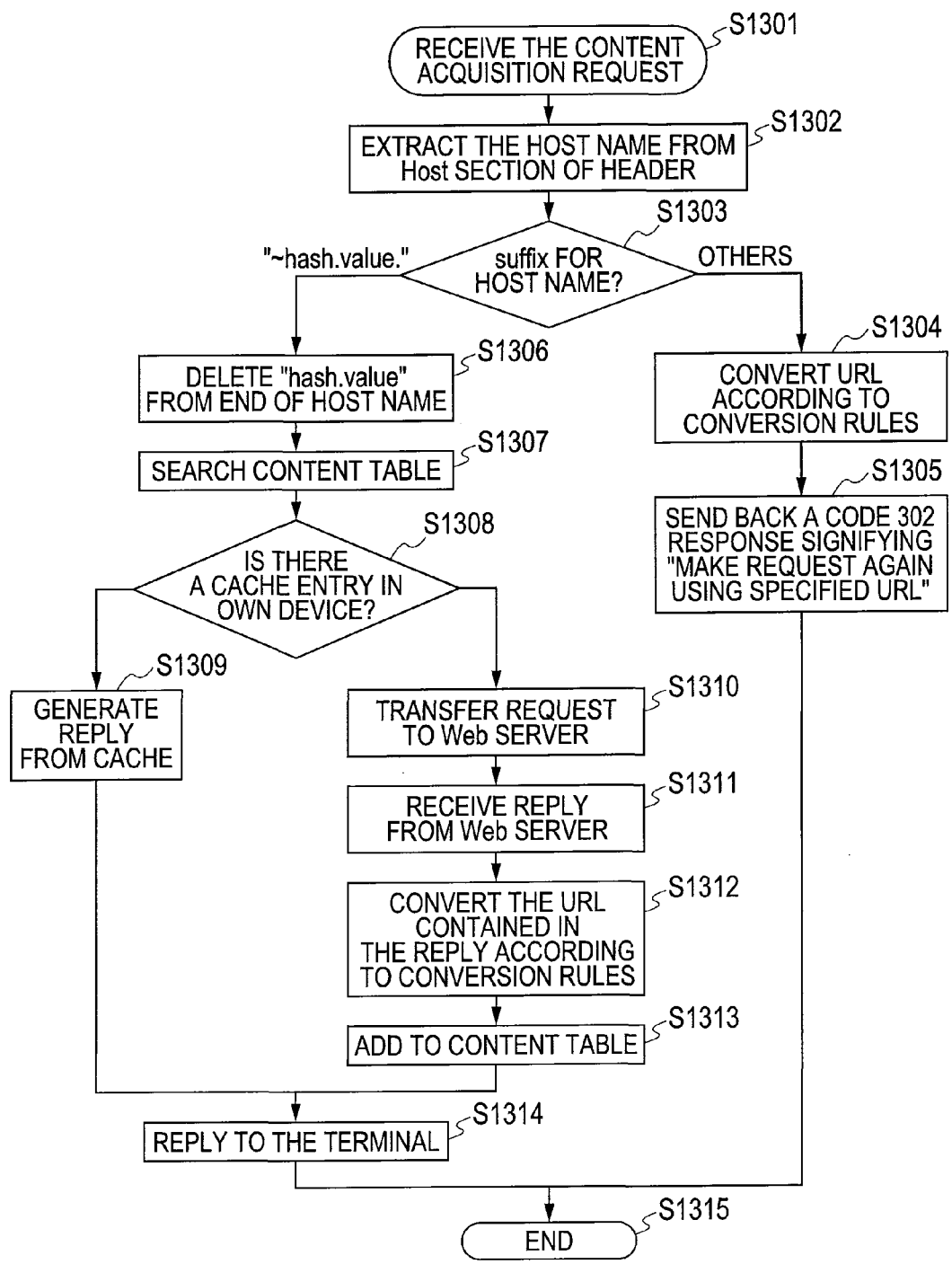
FIG. 13 is a flow chart for showing the process for acquiring contents executed by the Web proxy of the second embodiment of this invention.

FIG. 13 is a flow chart for showing the process for acquiring contents executed by the Web proxy 105 of the second embodiment of this invention.

After receiving the content acquisition request sent from the terminal 107 (S1301), a Web proxy 105 acquires the host name for the content acquisition request from the packet header in the received content acquisition request (S1302). The Web proxy 105 next decides whether or not the suffix 1206 (for example, ".hash.value") (or, hash value 1204) for the host name indicating a converted URL is contained in the acquired host name based on the URL conversion rules shown in FIG. 12 (S1303).

If the Web proxy 105 decides in step S1303 that the acquired host name does not contain a ".hash.value", then the URL contained in the content acquisition request that was received is not a URL converted based on URL conversion rules shown in FIG. 12 so the Web proxy 105 acquires the URL from the header in the packet of the received content acquisition request, and utilizes the hash function 215 to convert the acquired URL to a URL including a hash value based on the URL conversion rules (S1304).

The Web proxy 105 next sends back an HTTP reply for code 302 to the terminal 107 (S1305). A HTTP reply for code 302 as referred to here is an instruction the Web proxy 105 sends to the terminal 107 to resend a content acquisition request to the URL converted based on the URL conversion rules. After receiving the HTTP reply for code 302 the terminal 107 resends a content acquisition request to the URL containing the hash value shown in the received HTTP reply.

However, when the Web proxy 105 decides in step S1303 that the acquired host name does contain a ".hash.value", then the URL contained in the received content acquisition request is an already converted URL, so the Web proxy 105 deletes the character string ".hash.value" for Suffix 1206 in the hash value 1204 and host name, from the host section of the URL acquired from the header in the packet of the received content acquisition request, and restores the URL to the URL prior to conversion (S1306).

The Web proxy 105 next searches the entries in the content table 610 using the restored URL as a search key (S1307). The Web proxy 105 decides whether or not there is an entry matching the search key (S1308).

When the Web proxy 105 decides in step S1308 that there is an entry matching the search key, the contents requested by the terminal 107 have been cached so the Web proxy 105 forms a reply to the content acquisition request that utilized the contents stored in this entry (S1309).

However when the Web proxy 105 decides in step S1308 that there is no entry matching the search key, the contents requested by the terminal 107 have not been cached so the Web proxy 105 transfers the content acquisition request to the Web server 102 (origin server) (S1310). The Web proxy 105 in this case adds the new entry to the content table 610, and stores each of the restored URL and IP addresses in the newly added entries for URL611 and the destination IP address 612.

The Web proxy 105 next receives the reply to the content acquisition request from the Web server 102, and acquires the contents contained in the reply (S1311). Next, when the acquired URL contains the link destination URL, the Web proxy 105 converts that link destination URL to a URL containing a hash value based on the URL conversion rules shown in FIG. 12 (S1312). The Web proxy 105 then forms a reply to the content acquisition request by using the contents containing the converted URL.

The Web proxy 105 next stores the acquired contents, and the URL containing the link destination hash value, into the content 613 for entries corresponding to the content table 610 (S1313).

Finally, the Web proxy 105 sends a reply to the content acquisition request to the terminal 107 (S1314) and ends the processing (S1315).

FIG. 14 is a sequence diagram showing the process for acquiring contents in the gateway system of the second embodiment of this invention. The terminal 107 first of all sends the content acquisition request (for example, "GET/ex/2 HTTP/1.0 Host: www.example.org - - -" to the Web proxy 1_105-1 (S1401).

Prior to step S1401, the terminal 107 may send the name resolution request (for example, "AAAA? www.example.org") to the DNS proxy 104 by way of step S807 as shown in FIG. 8. The DNS proxy 104 may execute the name resolution request by way of the steps S808 and S809 shown in FIG. 8. In this way, the content acquisition request can in the same way as the first embodiment reach the Web proxy 1_105-1 assigned to the IP addresses (for example, "2001:db8::41de:3297:ec18:5fae") that correspond to "www.example.org".

Next, after receiving the content acquisition request sent from the terminal 107, the Web proxy 1_105-1 acquires the URL for the content acquisition destination from the header of the received content acquisition request, and based on the URL conversion rules shown in FIG. 12, converts the acquired URL to a URL containing a hash value such as http://www.example.org.820d92dcb08edcdd.hash.value/ex/2 (S1402). The Web proxy 1_105-1 then sends the HTTP reply for code 302 to the terminal 107 (S1403).

The DNS proxy 104 name resolution and address resolution processing are described next (S1404).

After receiving the HTTP reply for code 302, the terminal 107 once again sends a name resolution request to the DNS proxy 104 in order to acquire an IP address corresponding to a host name with a hash value (such as "www.example.org.820d92dcb08edcdd.hash.value") (S1404).

Unlike the processing in the first embodiment, the DNS proxy 104 here may extract only the hash value (for example, "820d92dcb08edcdd") from the host name containing the hash value (such as "www.example.org.820d92dcb08edcdd.hash.value").

The DNS proxy 104 may then combine the IPv6 prefix utilizing the address generating function 210, with the extracted hash value to generate the IP address.

The DNS proxy 104 may use the address generating function 210 to calculate a new hash value from the host name ("www.example.org.820d92dcb08edcdd.hash.value") containing a hash value, and generate an IP address based on the calculated hash value the same as in the first embodiment.

Further, in order to identify the device where the generated IP address is registered, the terminal 107 or the neighboring router sends an address resolution request, and acquires the MAC address of the Web proxy 105 assigned to the generated IP address.

The terminal 107 handles the generated IP address and for example sends a content acquisition request (for example,
"Get/ex/2 HTTP/1.0Host: www.example.org.820d92dcb08edcdd.hash.value . . . ") to the Web proxy 2_105-2 (S1405).

Next, the Web proxy 2_105-2 acquires the URL containing a hash value from the header in the received content acquisition request, and deletes the hash value (for example, "820d92dcb08edcdd") and the suffix (for example, ".hash value") for the host name, from the URL (for example, "http://www.example.org.820d92dcb08edcdd.hash.value/ex/2") containing the acquired hash value. The URL prior to conversion (the content acquisition destination URL requested in S1401 "http://www.example.org/ex/2") is acquired in this way. The Web proxy 2_105-2 next searches the contents table 610 using the URL acquired prior to conversion as the search key, and decides whether or not the contents corresponding to the URL of the search key have been cached or not (S1406). If the contents corresponding to the URL have not been cached here then the Web proxy 2_105-2 transfers the content acquisition request to the Web server 102 (S1407).

The Web proxy 2_105-2 next receives the reply to the content acquisition request from the Web server 102 (S1408). The Web proxy 2_105-2 then acquires the contents contained that received reply, and stores the acquired contents in the entry for content table 610 (S1409). Here, if the link destination URL is contained in the acquired contents, then the Web proxy 2_105-2 converts the URL contained in the contents based on the URL conversion rule shown in FIG. 12, and also stores the converted URL in the entry of the content table 610 (S1409).

The Web proxy in other words converts the URL contained in contents sent to the terminal 107 based on URL conversion rules, to a URL containing the values beforehand. This prevents two requests; a content acquisition request containing no ".hash.value" and a content acquisition request containing a ".hash.value" from being issued when accessing contents in the terminal 107.

The Web proxy 2_105-2 next sends the acquired contents and the URL containing the hash value for the link destination of the contents, to the terminal 107 as a reply to the content acquisition request (S1410).

If the link destination URL of the contents that were sent was clicked by the user then a hash value was already embedded in that link destination URL so the processing from steps S1401 through S1404 can be omitted.

The second embodiment as described above distributes the cached contents to the Web proxies in lower order path units rather than host units so the gateway system can achieve even more efficient load balancing.

What is claimed is:

1. A gateway system to distribute requests from multiple terminals to multiple first server devices, comprising:
   a plurality of second server devices;
   a name resolution device that generates an IP address from a character string; and
   a management device,
   wherein address generating functions, which are hash functions that generate a hash value from the character string, generate the IP address from the character string are distributed to the name resolution device,
   wherein a plurality of specified IP addresses are registered in each of the second server devices,
   wherein, when a first request for resolving a name of an access destination URL is received, the name resolution device:
   extracts the access destination URL from the received first request,
   generates the IP address from the character string of a host name of the extracted URL by utilizing the hash functions, and
   sends the generated IP address to a terminal as a reply to the first request, and
   wherein, when the terminal sends a second request setting the access destination of the URL for one of the first server devices to one of the second server devices where the IP address sent as a reply to the first request is registered, the one second server device transfers the second request to the one first server device based on the access destination URL,
   wherein the management device:
   distributes the address generating functions to the name resolution device,
   divides all IP addresses generated by the name resolution device into a plurality of IP addresses, and
   distributes the plurality of IP addresses to each of the second server devices, and
   wherein the second server devices register the plurality of distributed IP addresses.

2. The gateway system according to claim 1,
   wherein, after acquiring contents from the one first server device based on the second request for acquiring contents from the one first server device,
   the one second server device:
   links to the URL where the contents are stored, and then stores the acquired contents, and
   after receiving the second request sent from the terminal, decides whether or not to store the contents requested from the terminal, based on the URL extracted from the second request that was received, if the contents requested from the terminal are not stored, transfers the received second request to the one first server device, acquires the contents requested from the one first server device, and if the contents requested from the terminal are stored, transfers the stored contents to the terminal.

3. The gateway system according to claim 1, wherein the name resolution device is a DNS server.

4. The gateway system according to claim 1, further comprising:

an address converter device, wherein a plurality of specified IP addresses are registered in the address converter device, wherein a plurality of specified key IP addresses are registered in the one second server device, and wherein, when the terminal has sent a second request to the address converter device where the IP address that was sent is registered, the address converter device transfers the second request to the one second server device based on a corresponding relation between the plurality of registered specified IP addresses and a key IP address of the one second server device.

5. A gateway system to distribute requests from a plurality of terminals to a plurality of first server devices, comprising:

a plurality of second server devices; and a name resolution device, wherein a plurality of specified IP addresses are registered in each of the second server devices, wherein hash functions are distributed for generating a hash value from a character string, wherein each of the second server devices:

extracts an access destination URL from a received second request, after receiving the second request from one of the terminals for acquiring contents from one of the first server devices, decides whether or not a hash value is contained in the extracted URL, deletes the hash value from the extracted URL if the extracted URL contains a hash value, transfers the second request setting the URL whose hash value was deleted, as an access destination to the one first server device, generates a hash value from a character string of the extracted URL by utilizing the distributed hash functions if the extracted URL contains no hash value, adds the generated hash value to a host name of the extracted URL, and instructs the one terminal to resend the second request setting the URL containing the hash value as the access destination, and wherein the name resolution device extracts the access destination URL from the first request, when the one terminal sends a first request for resolving a name of the URL containing the hash value to the name resolution device, extracts the hash value from the extracted URL, combines a specified prefix with the extracted hash value to generate an IP address, and sends the generated IP address to the one terminal as a reply to the first request, and wherein the second request that was sent by the one terminal for setting the URL containing the hash value as the access destination, is sent to one of the second server devices for registering the IP address sent as a reply to the first request.

6. The gateway system according to claim 5, wherein the one of the second server devices:

acquires the contents from the one first server device based on the second request, generates a hash value from a character string of a link destination URL by using the distributed hash functions when the acquired contents contain the link destination URL, adds the generated hash value to a host name of the link destination URL, stores the acquired contents and the link destination URL, and sends the acquired contents and the link destination URL containing the hash value, to the one terminal as a reply to the second request.

7. A control method implemented on a gateway system that distributes requests from a plurality of terminals to a plurality of first server devices; the gateway system including a plurality of second server devices, a management device, and a name resolution device, an address generating function, which is a hash function that generates a hash value from a character string of an extracted URL host name, to generate an IP address from the character string, which is distributed into the name resolution device, and a plurality of specified IP addresses being registered into one of the second server devices, the control method comprising:

the name resolution device extracting an access destination URL from a received first request when the first request for resolving the name of an access destination URL is received from one of the terminals;

the name resolution device generating the IP address from the character string of the extracted URL host name by using the hash function;

the name resolution device sending the generated IP address to the one terminal as a reply to the first request;

the one second server device transferring a second request that was sent to one of the first server devices based on the access destination URL, when the one terminal sends the second request setting the access destination URL of the one first server device to the one second server device that registered the IP address that was sent;

the management device distributing an address resolution function to the name resolution device;

the management device dividing up all IP addresses generated by the name resolution device into a plurality of IP addresses;

the management device distributing all the plurality of IP addresses to each of the second server devices; and the second server devices registering the plurality of distributed IP addresses.

8. The control method for the gateway system including the management device according to claim 7, further comprising:

the management device distributing hash functions for generating a hash value from the character string of the extracted URL, to the one second server device;

the one second server device extracting the access destination URL from the received second request, after receiving the second request sent from the one terminal;

the one second server device deciding whether or not hash value is contained in the extracted URL;

the one second server device deleting the hash value from the extracted URL if the extracted URL contains the hash value;

the one second server device utilizing the distributed hash function to generate a hash value from the character string of the extracted URL, when the extracted URL contains no hash value;

the one second server device adding the generated hash value to the host name of the extracted URL; and the one second server device instructing the one terminal to resend the second request setting the URL containing the hash value as the access destination.

9. The control method for the gateway system according to claim 8, comprising:

the one second server device deciding after acquiring contents from the one first server device, whether or not the acquired contents contain a link destination URL based on the second request for acquiring contents from the one first server device;

the one second server device generating a hash value from a character string of the link destination URL by using a hash function, when the acquired contents contain the link destination URL;

the one second server device adding the generated hash value to a host name of the link destination URL; and the one second server device storing the acquired contents and the link destination URL containing the hash value, linking to the extracted URL whose hash value was deleted.

10. The control method for the gateway system according to claim 9, comprising:

the one second server device deciding whether the contents acquired from the one terminal are stored or not, based on the extracted URL whose hash value was deleted, after the step for deleting the hash value;

the one second server device transferring the second request for setting the extracted URL whose hash value was deleted as the access destination, to the one first server device, when the requested contents were not stored; and the one second server device sending the stored contents and the link destination URL containing the hash value to the one terminal when the requested contents were stored.

* * * * *